United States Patent
Lorentzen et al.

(10) Patent No.: US 9,613,362 B2
(45) Date of Patent: Apr. 4, 2017

(54) MONITORING A SITUATION BY COMPARING PARALLEL DATA STREAMS

(71) Applicant: BAKER HUGHES INCORPORATED, Houston, TX (US)

(72) Inventors: Håkon Lorentzen, Trondheim (NO); Odd Erik Gundersen, Trondheim (NO); Kerstin Bach, Trondheim (NO); Frode Sørmo, Trondheim (NO)

(73) Assignee: BAKER HUGHES INCORPORATED, Houston, TX (US)

( * ) Notice: Subject to any disclaimer, the term of this patent is extended or adjusted under 35 U.S.C. 154(b) by 162 days.

(21) Appl. No.: 14/056,550

(22) Filed: Oct. 17, 2013

(65) Prior Publication Data

US 2015/0112917 A1   Apr. 23, 2015

(51) Int. Cl.
| | | |
|---|---|---|
| *G06F 17/00* | (2006.01) | |
| *G06N 5/02* | (2006.01) | |
| *G06Q 30/02* | (2012.01) | |
| *G06N 5/04* | (2006.01) | |

(52) U.S. Cl.
CPC .......... *G06Q 30/0201* (2013.01); *G06N 5/04* (2013.01)

(58) Field of Classification Search
None
See application file for complete search history.

(56) References Cited

U.S. PATENT DOCUMENTS

| | | |
|---|---|---|
| 8,170,800 B2 | 5/2012 | Aamodt et al. |
| 9,078,629 B2 * | 7/2015 | Lakshminarayan . A61B 5/7282 |
| 2010/0235101 A1 | 9/2010 | Aamodt |

FOREIGN PATENT DOCUMENTS

WO   2010106014 A2   9/2010

OTHER PUBLICATIONS

Ahmed et al. "Health Monitoring for Elderly: An Application Using Case-Based Reasoning and Cluster Analysis", ISRN Artificial Intelligence, vol. 2013, Article ID 380239, 11 pages.*
Myllymaki et al. "Massively Parallel Case-Based Reasoning with Probabilistic Similarity Metrics", LNCS vol. 837, 1994, pp. 144-154.*
Ala-Kleemola et al. "Case Based Reasoning approach to automatic comparison of models", Fusion, 2005, pp. 1025-1029.*
Boehmer, W., "Analyzing Human Behavior Using Case Based Reasoning with the Help of Forensic questions," Advanced Information Networking and Applications (AINA), 2010 24th IEEE International Conference on, IEEE, 2010, 1189-1194.

(Continued)

*Primary Examiner* — Li-Wu Chang
(74) *Attorney, Agent, or Firm* — Cantor Colburn LLP

(57) ABSTRACT

Disclosed herein is a computer-implemented method of monitoring a situation by determining a set of one or more cases in case-based reasoning (CBR) the method comprising: receiving a data stream comprising information on a monitored situation; generating a plurality of parallel data streams from the received data stream; generating, for each of the parallel data streams, an overall similarity score between the parallel data stream and one of a plurality of cases, wherein each overall similarity score is generated from a comparison between one of the plurality of data streams and a different case; and determining a set of one or more cases in dependence on the generated overall similarity scores.

7 Claims, 12 Drawing Sheets

(56) References Cited

OTHER PUBLICATIONS

Watson, I., "Case-based reasoning is a methodology not a technology," Knowledge-based systems 12 (1999); 303-308.
Håkon Lorentzen, et al., "Case-Based Reasoning", U.S Appl. No. 14/056,516, filed Oct. 17, 2013.
Håkon Lorentzen, et al., "Case-Based Reasoning", U.S Appl. No. 14/056,562, filed Oct. 17, 2013.
Håkon Lorentzen, et al., "Case-Based Reasoning", U.S Appl. No. 14/056,575, filed Oct. 17, 2013.
Håkon Lorentzen, et al., "Case-Based Reasoning", U.S Appl. No. 14/056,582, filed Oct. 17, 2013.
List of Baker Patents or Patent Applications Treated as Related; INT0684US, Date Filed: Mar. 17, 2016, pp. 1-2.
Gundersen, et al, "A Real-Time Decision Support System for High Cost Oil-Well Drilling Operations", 2012; 8 pages.
Limthanmaphon, Benchaphon, and Yanchun Zhang. "Web service composition with case-based reasoning." Proceedings of the 14th Australasian database conference—vol. 17. Australian Computer Society, Inc. 2003, 8 pages.
Maurer, Michael, et al. "Toward knowledge management in self-adaptable clouds." Services (Services-1), 2010 6th World Congress on. IEEE, 2010, pp. 527-534.
Maurer, Michael, Ivona Brandic, and Rizos Sakellariou. "Simulating autonomic SLA enactment in clouds using case based reasoning." Towards a Service-Based Internet Springer Berlin Heidelberg, 2010. 25-36.
Yu, Ren, Benoit lung, and Herve Panetto. "A multi-agents based E-maintenance system with case-based reasoning decision support" Engineering applications of artificial intelligence 16.4 (2003): 321-333.

\* cited by examiner

FIG. 2

| Situation Description | Administrative Data | | |
|---|---|---|---|
| | Static Data | Symbol values | |
| | | Values | |
| | Dynamic Data | Instant Values | |
| | | Trends | |
| | | Activity | |
| | | Sequential Data | |
| Advice | Specific Lesson | | |
| | Alternative Response Action | | |
| | Proactive Measures | | |
| | General Lesson | | |

```xml
<?xml version="1.0" encoding="UTF-8"?>
<!DOCTYPE case PUBLIC "VT_casespec" "VTCase.dtd">
<case name="Case A">

<feature name="Voltage" type="Instant Value">
     <input valueType="Double">VOLTAGE</input>
     <stored valueType="Double">1.0</stored>
     <similarity_measure name="linear" source="Human">
       <formula>ABSOLUTE(VOLTAGE?stored)/(max-min)</formula>
     </similarity_measure>
     <configuration parameter="" source="Human">
       <min valueType="Double">0.0</min>
       <max valueType="Double">30.0</max>
     </configuration>
     <output>Voltage_similarity</output>
   </feature>

<feature name="Status" type="Instant Value">
     <input valueType="String">STATUS</input>
     <stored valueType="String">OFF</stored>
     <similarity_measure name="linear" source="Human">
       <formula>IF(STATUS==stored): 1.0 ELSE 0.0</formula>
     </similarity_measure>
     <configuration parameter="" source="Human">
     </configuration>
     <output>Status_similarity</output>
   </feature>

<aggregate_feature name="Global Similarity">
     <input valueType="Double">Voltage_similarity</input>
     <input valueType="Double">Status_similarity</input>
     <similarity_measure name="weighted average" source="Human">
       <formula>(wA*Voltage_similarity+wB*Status_similarity)/(wA+wB)
       </formula>
     </similarity_measure>
     <configuration parameter="" source="Human">
        <wA valueType="Double">1.0</wA>
        <wB valueType="Double">2.0</wB>
     </configuration>
     <output>Global_similarity</output>
   </aggregate_feature>

<section name="Advice">
     <section name="Specific Lesson">
     </section>
     <section name="Alternate Response Action">
     </section>
     <section name="Proactive Measures">
     </section>
     <section name="General Lesson">
     </section>
   </section>
</case>
```

*FIG. 3*

MONITORING A SITUATION BY COMPARING PARALLEL DATA STREAMS

FIELD OF THE INVENTION

The present invention relates to case-based reasoning. More particularly, embodiments of the invention provide efficient, effective, adaptable and scalable case-based reasoning techniques that can be applied in a broad range of industries, such as the finance, healthcare and energy industries.

BACKGROUND OF THE INVENTION

Predictive analytics is a tool for making and supporting decisions. Predictive analytics involves analysing historical data in order to predict future events and thereby automatically propose or take actions.

The majority of known predictive analytics systems are offline or batch processing systems that do not operate in real-time. The data used in the predictive analytics is separate from that used in operational systems and the data may be hours, days, weeks or even months old before analytics algorithms are applied to it. These techniques are not appropriate for applications in which it is necessary for the predictive analytics to be performed in real-time. Such applications may be, for example, the monitoring of an oil well drilling operation or an operation by a physician, in which it is necessary for problems to be detected, and proposals to be generated, very quickly.

A known technique for performing real-time predictive analytics is complex event processing, CEP. CEP systems generate alerts based on previously created rules for monitoring data. Such rule-based systems are inherently limited by the difficulty in defining and maintaining the rules. While a near real-time rule may be applied to data, the analytics required to create the rule is slow and not real-time. Moreover, the created rules are inflexible and incapable of adapting to changes in the data. The analysis needed to create and update rules is therefore undertaken offline. Accordingly, rule-based systems tend to only be used in stable and predictable environments in which it is possible to define a set of rules for all circumstances and for automatic actions to be taken.

Rule-based techniques are not appropriate for applying predictive analytics in fast-changing environments. Furthermore, there are scenarios in which it is not appropriate for automatic actions to be taken. If a critical or complicated decision is to be made, for example by an oil well operator during a drilling operation or by a physician during surgery, it is neither feasible nor desirable to take humans out of the decision making process.

Case-based reasoning, CBR, is a real-time predictive analytics technique that does not experience the above-described problems of rule-based techniques.

CBR systems detect and propose solutions to problems using information obtained from a plurality of cases stored in a case base. Each of the stored cases comprises a description of a problem and a description of a solution. The cases are typically generated manually based on actual experienced problems and devised solutions by system operators. Advantageously, CBR systems are able to provide system operators with detailed and reasoned solutions to complicated problems.

The application of predictive analytics to scenarios increasingly requires the use and handling of big data. Big data refers to a collection of data sets so large and complex that they become difficult to process using traditional data processing applications. For example, such big data could be encountered when applying predictive analytics within the financial services industry as a vast quantity of financial information is continuously generated and transferred between computing systems all over the world.

A problem with known CBR systems is that they are not designed for supporting and providing real-time operation on big data.

SUMMARY OF THE INVENTION

According to a first aspect of the invention, there is provided a computer-implemented method of monitoring a situation by determining a set of one or more cases in case-based reasoning, CBR, the method comprising: receiving a data stream comprising information on a monitored situation; generating a plurality of parallel data streams from the received data stream; generating, for each of the parallel data streams, an overall similarity score between the parallel data stream and one of a plurality of cases, wherein each overall similarity score is generated from a comparison between one of the plurality of data streams and a different case; and determining a set of one or more cases in dependence on the generated overall similarity scores.

Preferably, each of the overall similarity scores is generated by one of a plurality of comparison agents and each of the comparison agents receives one of the plurality of data streams.

Preferably, the method further comprises each comparison agent generating an overall similarity score by: receiving one of the plurality of data streams; generating a further plurality of parallel data streams, wherein each of the generated further plurality of parallel data streams is dependent on the received one of the plurality of data streams; generating, for each of said generated further plurality of parallel data streams, a similarity score in dependence on a comparison between information on a feature in the generated further data stream and stored information on the feature of a case, wherein each of the similarity scores of said generated further plurality of data streams is generated in dependence on a comparison with stored information on a different feature of the same case; and generating an overall similarity score between the received one of the plurality of data streams and the case in dependence on the generated similarity scores.

Preferably, the method further comprises determining to include a case in the set of one or more cases if the overall similarity score for the case is above a predetermined threshold level.

Preferably, the determined set of cases has a predetermined number of two or more cases, and the method comprises determining the predetermined number of cases for including in the set as the cases with the highest overall similarity scores.

Preferably, the method further comprises displaying information dependent on each of the determined one or more cases.

Preferably, each case comprises information that describes a situation in one of the finance industry, healthcare industry or energy industry.

According to a second aspect of the invention, there is provided a case-based reasoning, CBR, engine for monitoring a situation by determining a set of one or more cases, wherein the CBR engine is configured to perform any of the above-described methods.

According to an third aspect of the invention, there is provided a non-transitory computer-readable storage medium storing a computer program that, when executed by a computing device, controls the computing device to perform any of the above-described methods.

BRIEF DESCRIPTION OF THE DRAWINGS

Embodiments of the present invention will be described, by way of example only, with reference to the accompanying drawings, in which:

FIG. 2 is schematic diagram of a case for use in embodiments;

FIG. 3 is an XML representation of a case according to an embodiment;

DETAILED DESCRIPTION

Embodiments of the invention provide CBR techniques that are advantageous over known predictive analytics techniques. Embodiments allow CBR systems to be realised that are fast and scalable, as required for real-time operation on big data. Moreover, the CBR systems according to embodiments are adaptable and can be used for many applications.

CBR systems according to embodiments are particularly effective in the energy, finance and healthcare industries.

In the oil industry, the CBR techniques of embodiments identify and prevent drilling problems and thereby greatly reduce both costs and drilling time. The techniques are especially advantageous in complex drilling operations and multi-well operations as they are able to manage high volumes of data and to quickly recognise trends and indicators. The CBR techniques are also applicable to the energy industry in general and are not limited to the oil industry. For example, they may be used to detect and prevent problems in the electrical power generation industries.

In the finance industry, it is highly desirable for financial services organisations to have effective systems for predicting and detecting volatility due to any problems that may be caused by IT and service outages, capacity and risk issues, compliance pressures and trading errors. These problems can result in very large financial losses and serious damage to reputations and customer confidence. Although there are already financial services organisations that have IT systems and data for predicting business compromising events, the CBR techniques according to embodiments provide an analytics tool on top of the existing data-capture technology to generate proposals for preventing problems from occurring and solving any problems that have occurred. The CBR techniques also provide better assurance for staying in compliance with regulatory requirements and protecting organisations from third-party mistakes. Risk and compliance officers can look at actual past events (default rates, VAR, etc.) to measure the risk of using similar strategies in the future. Organisations can also detect anomalous events occurring within the industry to protect themselves from other organisations mistakes.

In the healthcare industry, CBR techniques according to embodiments enable hospitals to improve the quality of patient care and reduce costs. The CBR techniques apply real-time analysis to identify and manage impacting events by providing physicians with evidence-based decision support.

Figure 1:
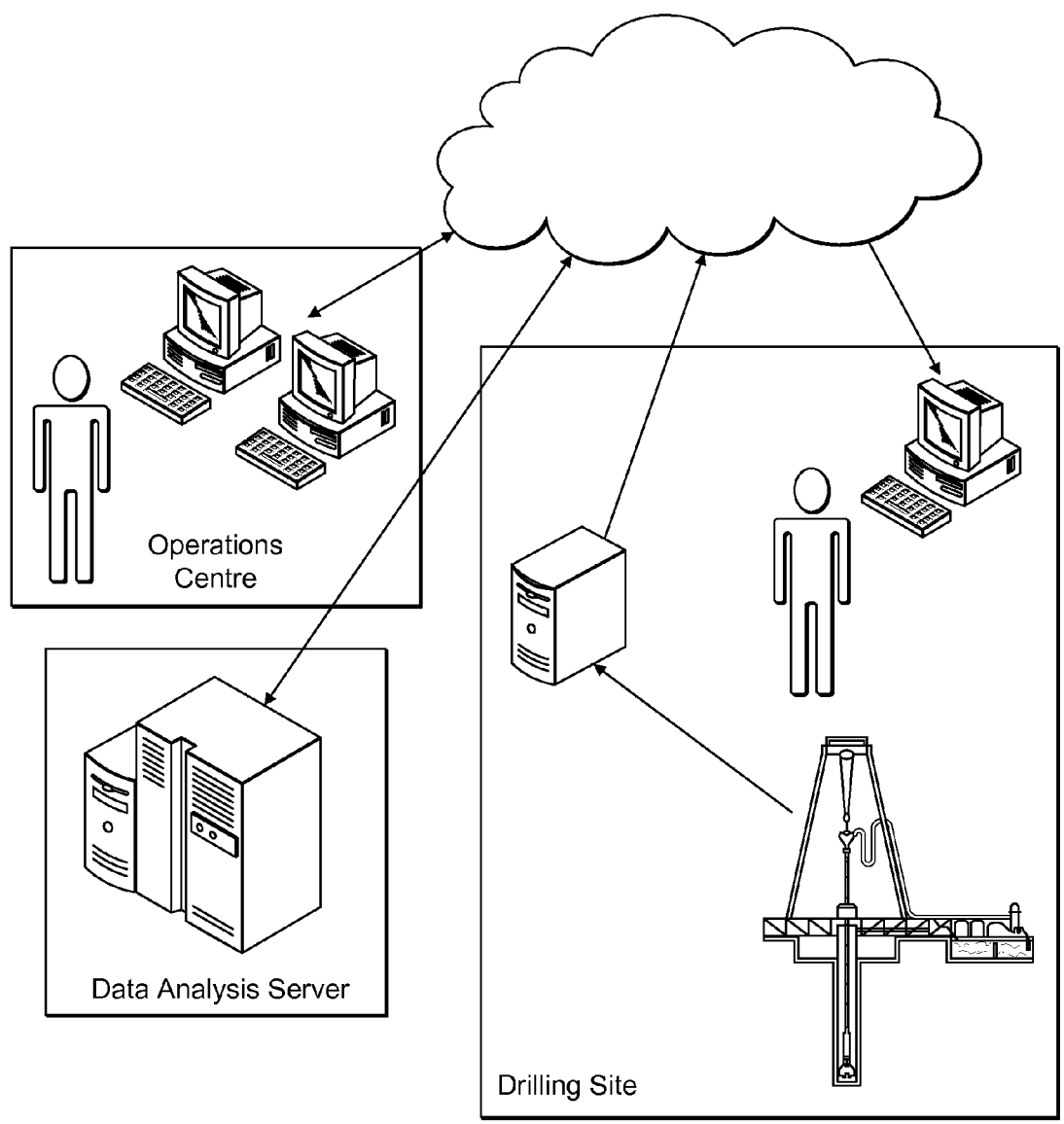
FIG. 1 provides an overview of a situation in which a CBR system is used.

There are many ways of incorporating a CBR system into the control of a situation. For example, the type of implementation as shown in FIG. 1 may be used in which the monitored situation (in this example a drilling operation), the data analysis server comprising the CBR system and the operations centre are all remote from each other and communicate over a network, such as a local network or the internet. Alternatively, the data analysis server and/or operations centre may be local to the situation.

An example of how CBR could be implemented in a hospital is for patients being operated on to all have their temperature, blood pressure and other characteristics continuously monitored. The monitored parameters could be transmitted to a data analysis server comprising a CBR system within the hospital. For each patient, any detected problems and proposed solutions are then displayed, in the operating theatre, to the surgeon operating on the patient. There may also be an operations centre within the hospital in which the results from the CBR system for all of the operations that are occurring at that time are displayed so that all of the operations can be monitored together.

An overview of how the CBR techniques according to embodiments are advantageous over known CBR techniques is provided below.

In order to compare information obtained from a monitored situation to stored information in a case, the CBR techniques according to embodiments create a comparison agent for each of the cases in a case base. A comparison agent is an instantiation of a case containing information describing how to compare a previous situation described by the case with a current situation. Each comparison agent comprises computational units that hold all the information required for comparing a feature of a stored case with data streams describing the current situation. The computational units are created in dependence on one or more values of parameters of a stored case feature, a function defining how to determine a similarity as well as any other information required for comparison, such as weighting information or minimum and maximum values. A plurality of parallel data streams are generated from a received data stream that comprises information on monitored parameters of a situation. The plurality of data streams are then streamed into the computational units of the comparison agents. Each computational unit then compares a subset of the parameters in the streamed data with their stored parameters, that correspond to a feature of a case, to generate a similarity score between the received data stream and the feature. All of the features of a case have a corresponding computational unit that computes the similarity between one or more parameters describing a monitored situation and the feature that describes a past situation. An overall similarity score between a monitored situation and the case is then calculated in dependence on the similarity score calculated for each feature.

Advantageously, received data is streamed directly into the computational units of comparison agents. This allows a very fast comparison of features to be performed. Embodiments differ from, and are faster than, all known CBR techniques as these require the additional step of first generating a file comprising information on monitored parameters of a situation, referred to herein as a current case, and then comparing the current case with stored case information.

In addition, in embodiments all of the comparison agents operate in parallel with each other. This is a lot faster than known CBR systems that sequentially compare a current case with each case of a case base.

A further advantage is provided by the way in which each comparison agent generates an overall similarity score. The comparison agents are configured not only with stored parameter information for a case, but also with weight information of parameters and functions that describe how the comparison agent should compare received and stored information. This allows a more sophisticated and tuneable comparison technique to be applied and the generated similarity score is therefore more accurate.

In addition, the CBR cycle for generating new or revised solutions to problems is faster and more efficient than known CBR cycles.

CBR techniques according to embodiments are performed by a CBR engine supported by a CBR platform. The CBR platform is able to integrate with other existing systems and can therefore be used in many applications. The CBR platform, and in particular the CBR engine within the platform, are also highly scalable.

The CBR techniques according to embodiments are described in more detail below.

FIG. 2 is a schematic diagram showing how the information within a case 21 for use in embodiments may be structured.

Each case 21 comprises a description of a problem, shown as a situation description, and a description of a solution, shown as advice. Stored information within each of these sections may be further categorised into sub-sections, such as dynamic and static data for the situation description. Within each sub-section, the stored information may be further categorised further sub-sections. Although, not shown in FIG. 2, there may be a number of further categorisations of the stored information into smaller and smaller sub-sections.

The smallest sub-sections of stored information for the situation description are features of the case 21. Each problem that a case 21 solves is represented by a set of features with each feature comprising stored values of a parameter. Values of the same parameter can also be obtained from a monitored situation.

Each feature may be combined with other features to form an aggregate feature. The features that are combined to form the aggregate feature are the child features of the aggregate feature. Each aggregate feature may itself be a child feature of another aggregate feature.

The structure of the situation description of each case 21 is defined by a case description graph. The case description graph may be a directed acyclic graph, DAG, a tree or other types of structure. The nodes of the graph denote the features of the case 21 while the edges, or paths between the nodes, correspond to the relationships between the nodes. That is to say, a leaf node in a tree structure corresponds to a feature that does not depend on any other feature and the other nodes within the tree structure correspond to aggregate features.

Features can have any data type. For example, the data type can be just a number with a unit or a symbol, or it can be more complex, such as a set, a vector or a sequence of numbers or symbols. Features can even be natural language text. There is no restriction on the format or type of the features describing a case 21.

The comparison between a stored case 21 in a case base and an input data stream from a monitored situation is performed by comparing the parameter information stored within the features on a feature by feature basis. Aggregate features have at least one input that is an output from another feature comparison. Although parameters within the received data stream may also be directly input to an aggregate feature, aggregate features typically have only outputs from other feature comparisons as inputs. The output of a feature comparison is a similarity score while the aggregated similarity score for all features of a case 21 is an overall similarity score for the comparison between the stored case 21 and the received data stream.

For every feature, including the aggregate features, comparison information is defined. The comparison information may include weights, comparison functions and any other configuration information, such as max and min values for numeric similarity measures or range limits for sequences. A comparison function is a function that measures the similarity of one or more received and stored parameters to thereby generate a similarity score that is a measure of the similarity between a feature of a case 21 and information from a monitored situation. The comparison function for a feature may use any of the other information in the comparison information, such as weights of parameter values, when generating a similarity score for the feature.

All of the features that receive parameters in the data stream may comprise weights that are applied to the stored parameter information and/or the parameters in the data stream. Each aggregate feature may also comprise weights that are applied to each of its inputs. The weights allow the contributions of each of the features to be controlled and therefore the relative importance of each feature to be included in the information describing a situation. Local weights can be distinct for each feature and are individual for each case 21. Local weights need to be stored on a case-by-case basis. Global weights apply to different cases 21 in the same manner and need only be stored centrally. Global weights become local weights once they are customised for individual cases 21.

In addition to weighting the one or more parameters that describe features, every feature may also have a comparison function that defines how the feature is to be compared against input parameters from the data stream. The comparison function for a feature can be any mathematical function that generates a result in dependence on the parameters. Each comparison function can be individualised to each feature. Features may be provided with a default comparison function or a comparison function that has been determined by a system operator.

All of the cases 21 according to embodiments comprise metadata for storing the comparison information for all of the features of each case 21. Metadata can also comprise further information describing a case 21, such as units and textual descriptions of the features to help system operators understand each feature.

The above-described case 21 structure according to embodiments differs from the case structure used in known CBR systems that do not store metadata in the cases themselves. Advantageously, each case 21 can be modelled individually. The original compiler of a case 21 has full control over which features are chosen to describe the case 21, how stored and measured information is compared for each of the features, and how an overall similarity score is generated for the case 21. If required, the metadata for each case 21 can also be modified at a later stage by a system operator in order to change how the case 21 is compared with monitored data. A system operator can therefore tune the comparison of the case 21.

With regard to the case solution, if it is not required for the solution to be automatically modified by a computer, then this can be a textual description of how to solve the problem. Otherwise, the case solution needs to be represented in a format that can be understood by a computer. This advantageously allows a solution to be automatically devised that is based on a plurality of similar cases 21 to the current situation. How to represent a case solution so that it can be understood by computers is known in the art.

Each case 21 can be stored as an XML file, such as the example shown in FIG. 3. There are a number of alternative forms in which each case 21 can be stored, such as serialised code.

All of the cases 21 are stored in a case base. The case base may be, for example, a single database, a plurality of databases distributed across a plurality of hardware devices, a directory on a server or a plurality of directories on one or more servers.

In order to compare the cases 21 in a case base with monitored information on a situation from a received data stream, a comparison agent is created for each case 21 in the case base. Each comparison agent is created in dependence on the case 21 description graph for the situation description of the case 21.

Figure 4:
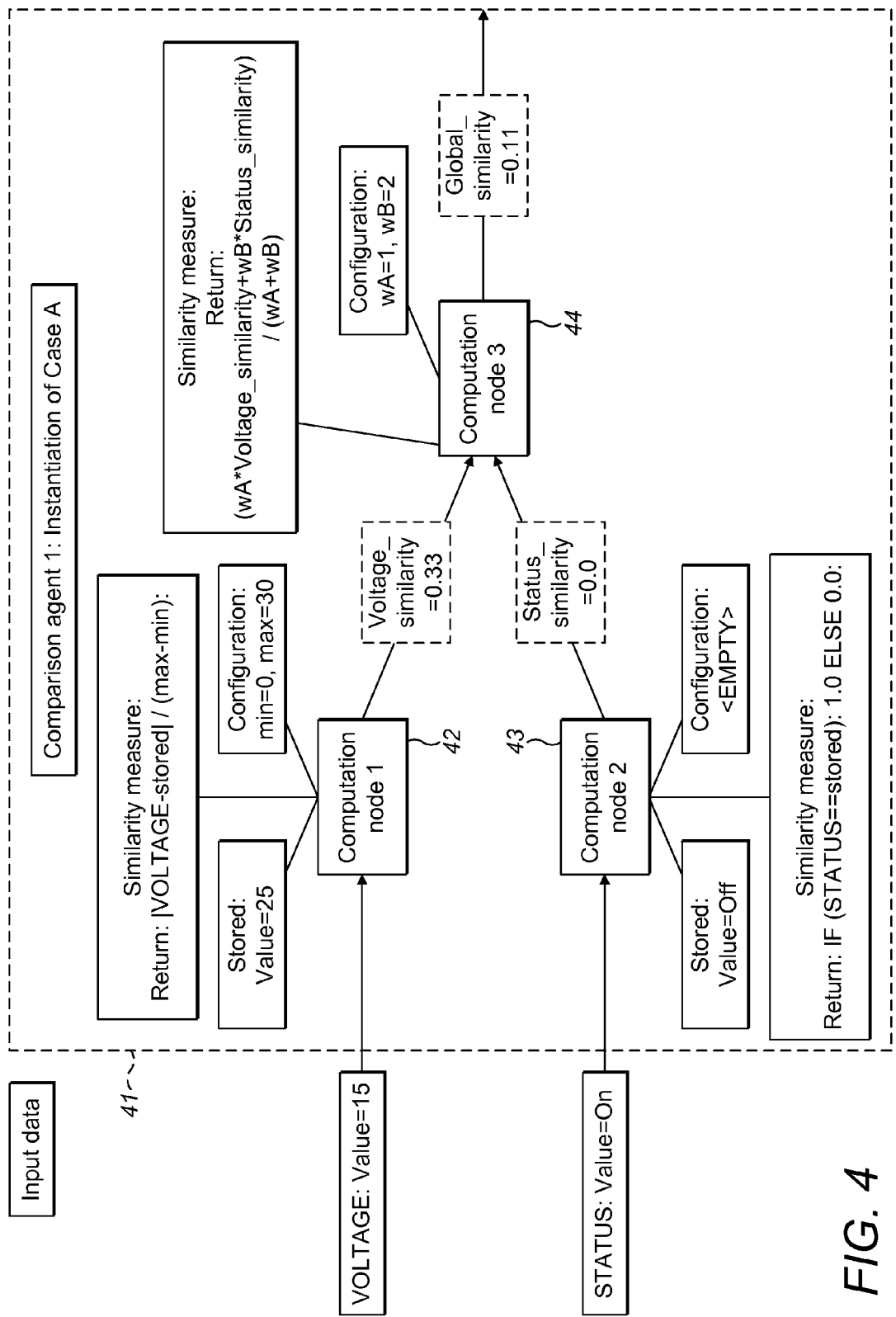
FIG. 4 is a block diagram of a comparison agent according to an embodiment.

An example of a comparison agent 41 for comparing parameters in a received data stream with a case 21 is shown in FIG. 4. A computation unit has been created for each feature of the case 21. The relative arrangement of the computation units has been defined by the case description graph for the case 21 and the comparison information of the case 21 has been used to configure how each computation unit operates.

Computation Node 1 is a computation unit that has been configured to generate a comparison result between a received and a stored value of a voltage. In addition to being created with the stored value of the voltage, Computation Node 1 has been configured to compare the stored and received value of the voltage according to the comparison information of the feature that Computation Node 1 corresponds to. The comparison information includes a Similarity Measure, that is a mathematical function that describes how a result is generated, as well as a Configuration, that specifies limits on the voltage values.

Computation Node 2 has been configured to generate a comparison result between a received and stored value of a status. It has been created with a stored value of the status and has been configured to compare the stored and received value of the status according to the comparison information of the feature that Computation Node 2 corresponds to.

Computation Node 3 has been created for an aggregate feature. Computation Node 3 receives as inputs the outputs from Computation Nodes 1 and 2. It has been configured to weight and combine its inputs according to the comparison information of the aggregate feature that it corresponds to in order to generate an overall comparison result, i.e. overall similarity score.

Figure 5:
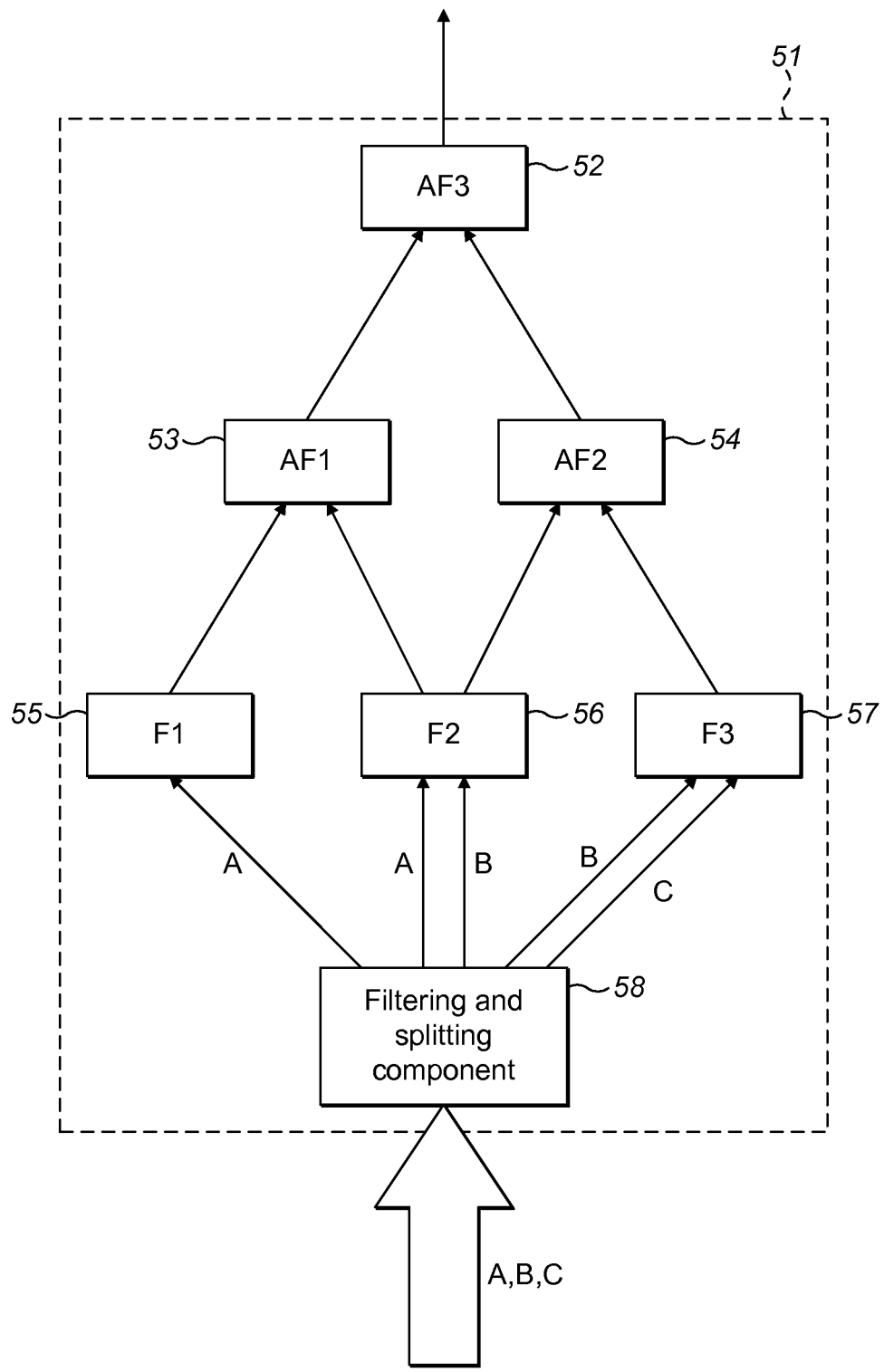
FIG. 5 is a block diagram of a comparison agent according to an embodiment.

FIG. 5 shows another example of a comparison agent 51. The comparison agent 51 comprises computation units for features F1, F2 and F3 as well as for aggregate features AF1, AF2 and AF3. The comparison agent 51 also comprises a filtering and splitting component 58. A received data stream comprises data streams of parameters A, B and C. The received data stream is input to the filtering and splitting component 58 that generates a plurality of parallel data streams that are output to features F1, F2 and F3. The filtering ensures that each of the parallel data streams comprises only the parameters that are required by the computation unit that the data stream corresponds to. Accordingly, a data stream comprising only parameter A is sent to F1 as the computation unit F1 only performs a comparison between a received and stored value for parameter A. The data stream sent to F2 differs from that sent to F1 and comprises a data stream of parameter A as well as a data stream of parameter B. F2 only performs a comparison between received and stored values of parameters A and B and so these are the only data streams of parameters that are sent to it. Similarly, F3 only performs a comparison between received and stored values of parameters B and C and so these are the only data streams of parameters that are sent to it.

Figure 6:
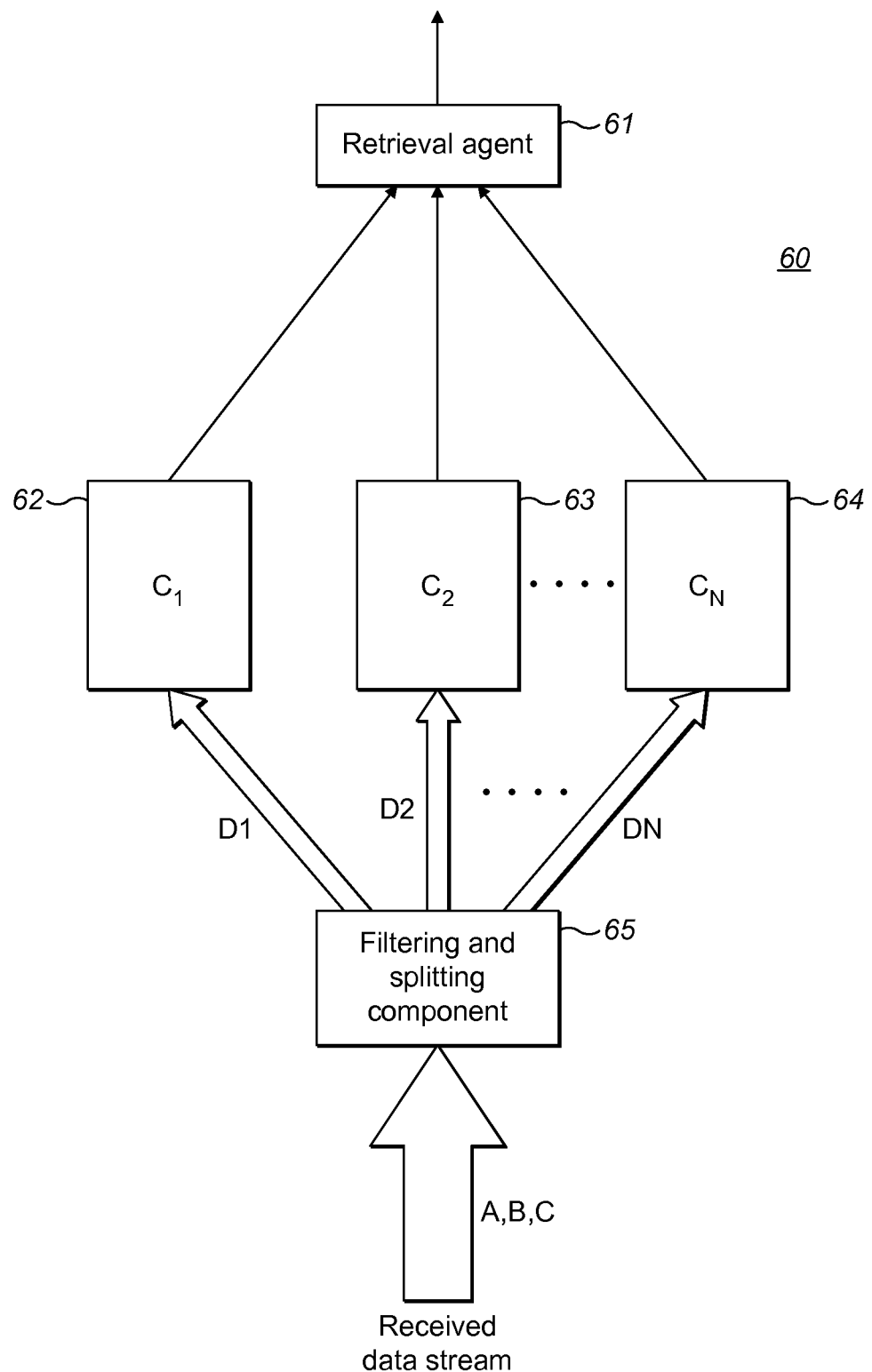
FIG. 6 is a block diagram of part of a CBR engine according to an embodiment.

FIG. 6 shows the part of a CBR engine 60 that performs case comparison and retrieval for determining one or more similar cases 21 to a current situation according to embodiments. The cases 21 are stored in a case base comprising N cases 21. Comparison agents for each of the N cases 21 are created according to the techniques described above. The CBR engine 60 comprises the plurality of comparison agents, $C_{1-N}$, arranged in parallel with each other, a filtering and splitting component 65 and a retrieval agent 61. A received data stream from a monitored situation is input to the filtering and splitting component 65. The filtering and splitting component 65 divides the data stream into a plurality of N parallel data streams, with each of the plurality of parallel data streams being sent to a different comparison agent. The filtering and splitting component 65 also filters the received data stream so that each comparison agent only receives data streams comprising parameters that are required by the comparison agent.

The retrieval agent 61 receives overall similarity scores from each of the comparison agents. On the basis of the received overall similarity scores, the retrieval agent 61 determines if there are any cases 21 in the case base with similar situation descriptions to the situation being monitored. One strategy that may be used by the retrieval agent 61 is to retrieve all cases 21 that have an overall similarity score that is above a pre-determined threshold level. Alternatively, the retrieval agent 61 may use the strategy of always retrieving the same predetermined number of cases 21, the retrieved cases 21 having the highest overall similarity scores. Other retrieval strategies are also possible.

Figure 7:
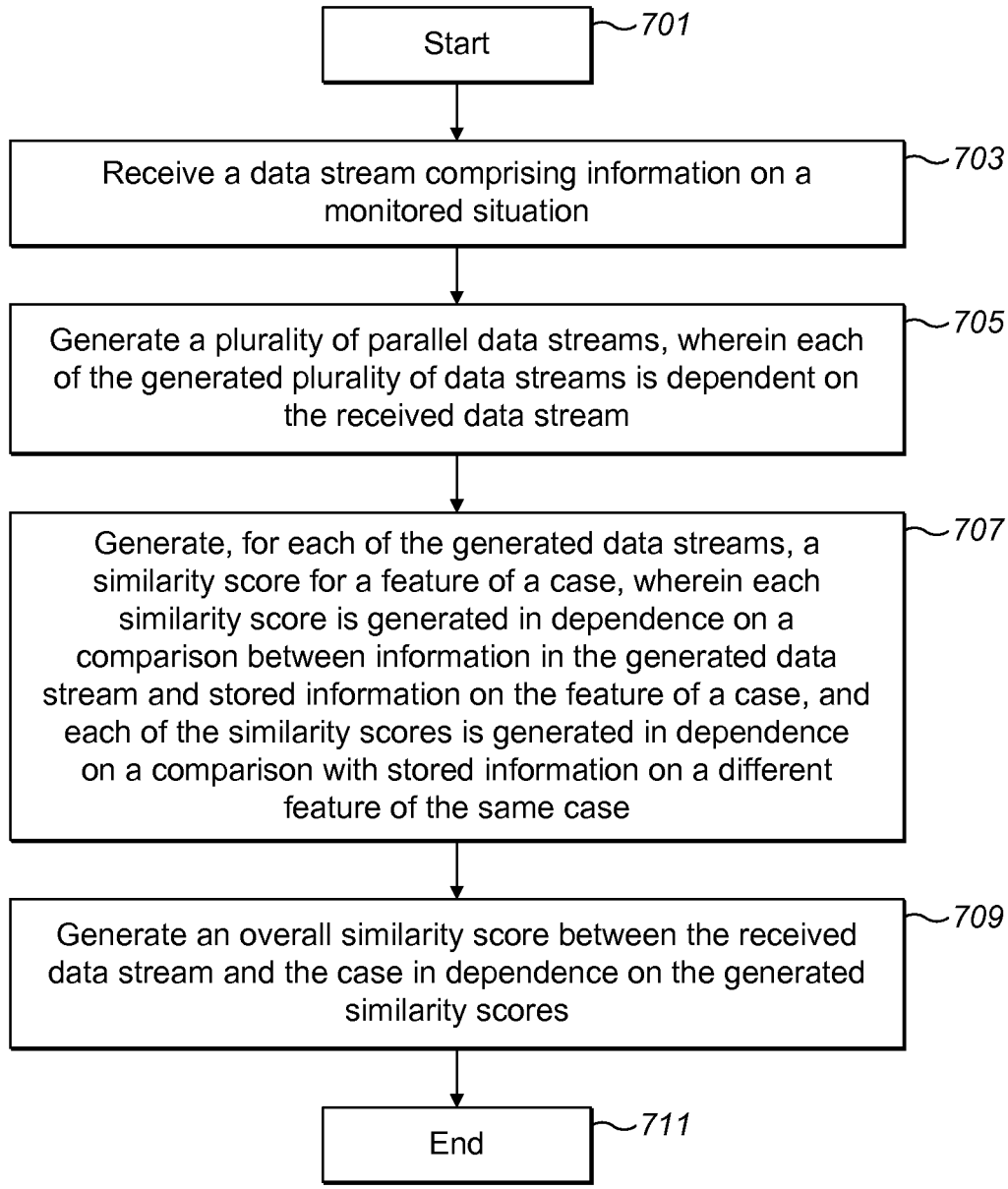
FIG. 7 shows the steps of a method for generating an overall similarity score between a received data stream and a case according to an embodiment.

FIG. 7 shows the steps of a computer-implemented method of monitoring a situation by generating an overall similarity score between a received data stream and a case 21 according to an embodiment.

The method starts in step 701.

In step 703, a data stream is received comprising information on a monitored situation.

In step 705, the method generates a plurality of parallel data streams, wherein each of the generated plurality of data streams is dependent on the received data stream.

In step 707, the method generates, for each of the generated data streams, a similarity score for a feature of a case 21, wherein each similarity score is generated in dependence on a comparison between information in the generated data stream and stored information on the feature of a case 21, and each of the similarity scores is generated in dependence on a comparison with stored information on a different feature of the same case 21.

In step 709, the method generates an overall similarity score between the received data stream and the case 21 in dependence on the generated similarity scores.

In step 711, the method ends.

Figure 8:
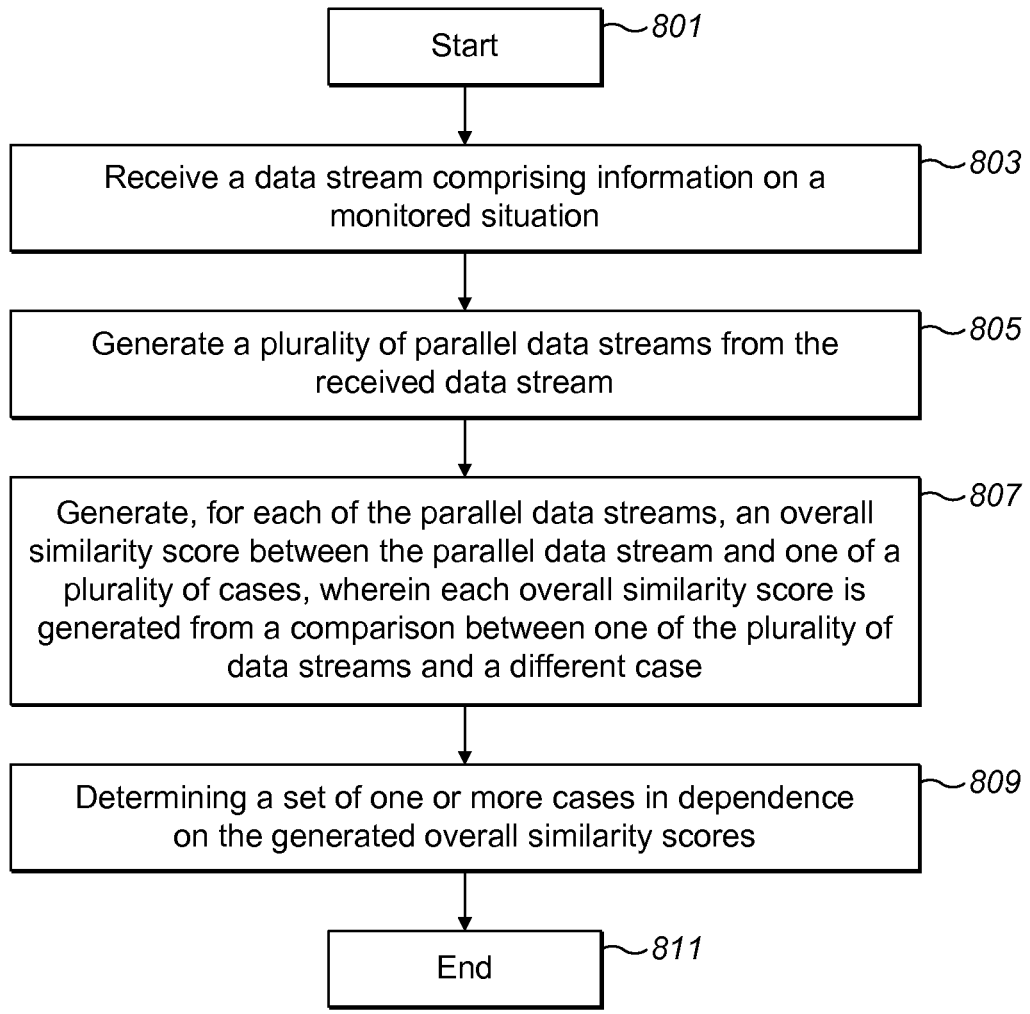
FIG. 8 shows the steps of a method for determining a set of one or more cases by a CBR engine according to an embodiment.

FIG. 8 shows the steps of a computer-implemented method of monitoring a situation by determining a set of one or more cases 21 by a CBR engine according to an embodiment.

The method starts in step 801.

In step 803, a data stream is received comprising information on a monitored situation.

In step 805, the method generates a plurality of parallel data streams from the received data stream.

In step 807, the method generates, for each of the parallel data streams, an overall similarity score between the parallel data stream and one of a plurality of cases 21, wherein each overall similarity score is generated from a comparison between one of the plurality of data streams and a different case 21.

In step 809, the method determines a set of one or more cases 21 in dependence on the generated overall similarity scores.

In step 811, the method ends.

Figure 9:
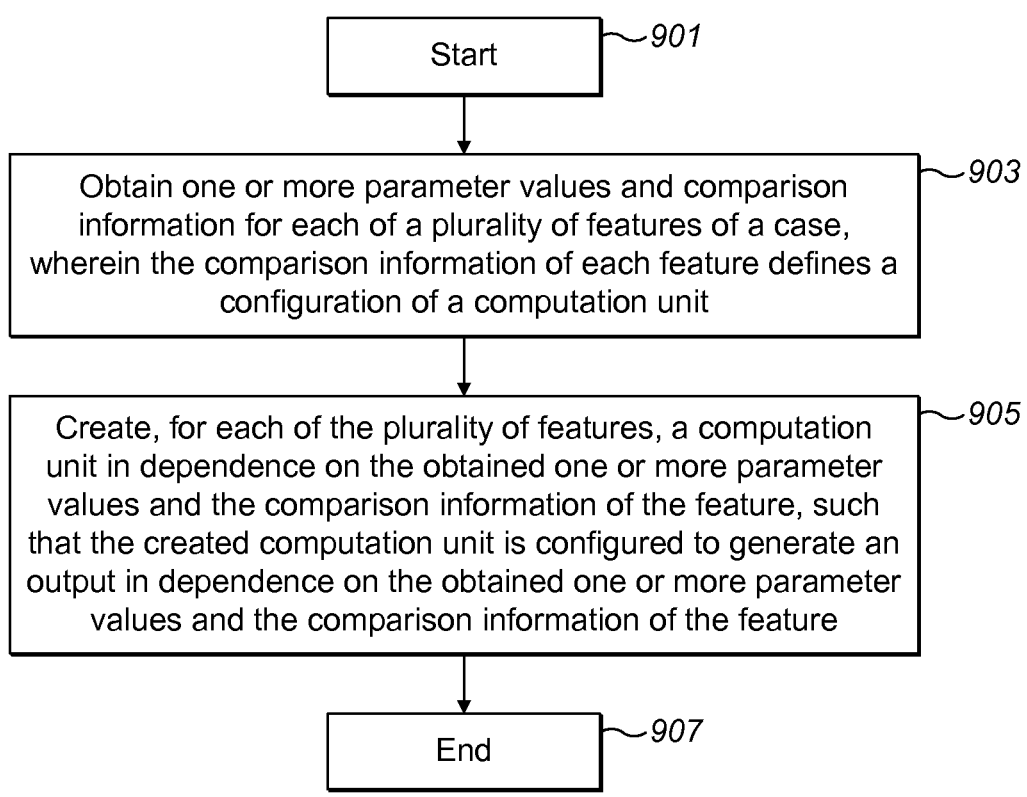
FIG. 9 shows the steps of a method for creating components of a comparison agent according to an embodiment.

FIG. 9 shows the steps of a computer-implemented method for creating components of a comparison agent for monitoring a situation according to an embodiment.

In step 901, the method starts.

In step 903, the method obtains one or more parameter values and comparison information for each of a plurality of features of a case 21, wherein the comparison information of each feature defines a configuration of a computation unit.

In step 905, the method creates, for each of the plurality of features, a computation unit in dependence on the obtained one or more parameter values and the comparison information of the feature, such that the created computation unit is configured to generate an output in dependence on the obtained one or more parameter values and the comparison information of the feature.

In step 907, the method ends.

The above described embodiments of the invention provide significant advantages over known CBR systems.

Advantageously, a similarity score for each feature of a case 21 is generated by a computation unit that receives a data stream, or data streams, of parameters from the monitored situation. The similarity score for each feature is therefore generated extremely quickly and this allows the CBR techniques of embodiments to be applied in real-time.

A further advantage is provided by filtering the received data stream so that only the required data streams of parameters are sent to the computation unit for each feature. This reduces the amount of data transmission within the CBR platform.

The arrangement of the comparison units in FIGS. 4 and 5 has been defined by the case description graph for the case 21 that the comparison agent corresponds to. In FIG. 5, for example, it is clear that computation units F1, F2 and F3 correspond to leaf nodes of a tree structure and that AF3 corresponds to the root node of the tree.

Advantageously, since the comparison agent for each case 21 is built according to a case description graph such as a tree, each comparison agent can be flexibly configured. This allows a system operator to accurately control how each case 21 is compared with received information and how each overall similarity score is generated.

Moreover, FIGS. 4 and 5 show very simple comparison agents that require very few computation units. The comparison agent of an actual case 21 that describes, for example, a drilling operation may contain computation units that correspond to hundreds, or even thousands, of features and the comparison agent would be a lot larger and more complicated. A tree based design is particularly advantageous for such large comparison agents since inputting streams of data parameters directly into a parallel arrangement of computation units allows an overall similarity score to be generated quickly.

The above-described techniques for generating an overall similarity score between stored information for a case 21 and received information from a monitored system are a completely different approach to generating an overall similarity score from that used in known CBR systems.

The design of all known CBR systems has been based on the concept that to find a similar case in a case base to a situation, it is first necessary to create a current case, i.e. a description of the monitored situation, and to compare the current case with descriptions of problems in each of the cases in a case base. Known CBR systems have therefore always performed the time consuming process of building a current case that describes the current situation. A further problem with creating such a current case is that the same current case is compared with each case. This is inefficient since a comparison agent may be provided with parameter information that it does not require. In particular, in a distributed system to send the current case to all case comparison agents results in a lot of information being unnecessarily transported within the system. This increases the network traffic and slows down the system.

The system design of FIG. 6 advantageously allows the input of a plurality of parallel data streams directly into comparison agents. The process of generating a current case and the overhead of transmitting the entire current case within the system is therefore avoided. In addition, by filtering each of the data streams that are sent to each of the comparison agents, the data streams only comprise the data streams of parameters that are required for each case 21. This reduces the amount of information that is communicated within the system. Furthermore, the parallel arrangement of comparison agents allows features of cases to be matched in parallel. This is not possible with, and is a lot faster than, all known CBR systems.

The output from the retrieval agent 61 shown in FIG. 6 is one or more similar cases 21. From these retrieved cases 21, a solution to a problem, that has been identified from the received data stream from the monitored situation, can be generated and provided to a system operator. One way of easily generating a solution is to directly copy the solution provided in the case 21 with highest overall similarity score. More advanced solutions may be generated by adapting the solution(s) provided in the one or more retrieved cases 21 so as to generate a solution that is dependent on the solution(s) in one or more of the retrieved cases 21. A system operator may also provide a completely new solution, not dependent on any of the solutions of the retrieved cases 21, as the solution to a problem that has been determined from the received data stream.

For each problem that is determined from a received data stream and for which a solution has been generated, by any of the above-described techniques, a new case 21 may be generated for which the situation description is dependent on the monitored situation determined from the received data stream and the advice is dependent on the generated solution. The determination to generate such a new case 21, and to store the new case 21 in the case base, may be made by a system operator or performed automatically.

Figure 10:
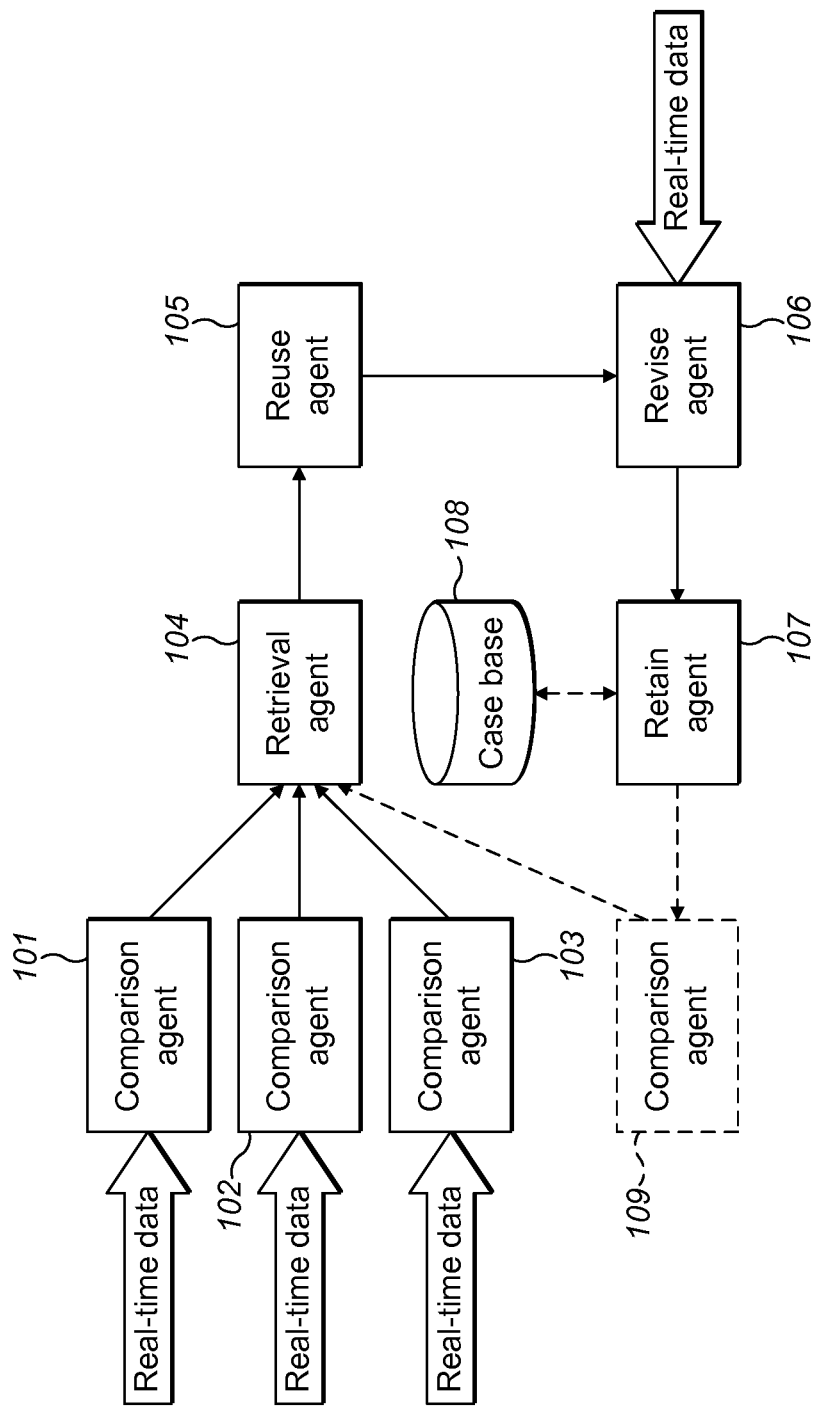
FIG. 10 is a block diagram showing a CBR cycle according to an embodiment.

FIG. 10 shows a CBR cycle for generating a new case 21, and storing the new case 21 in a case base 108, according to an embodiment. The CBR cycle is implemented with a retrieval agent 104, a reuse agent 105, a revise agent 106 and a retain agent 107. The process also requires a situation description agent which not explicitly shown in FIG. 10.

The retrieval agent 104 operates as described above and determines one or more similar cases 21 in dependence on the outputs of the comparison agents 101, 102 and 103.

The reuse agent 105 outputs information from cases 21 for display to a system operator. The output information may be copied from the solution of only one case 21, or the output information may be a solution generated automatically by the reuse agent 105 in dependence on two or more solutions from retrieved cases 21.

The retrieval and revise agents may operate in substantially the same way as these agents operate in known CBR cycles.

The purpose of the revise agent 106 is to ensure that the proposed solution is appropriate for the current monitored situation. The revise agent 106 can adapt the solution generated by the reuse agent 105 or provide a completely new solution, not dependent on the solution generated be the reuse agent 105. The generation of a solution by the revise agent 106 may be performed automatically, such as in response to automatic testing determining that adaption of the solution is required, or controlled, partially or fully, by a system operator. To the extent that a solution for a case 21 is generated, the revise agent 106 may perform in substantially the same way as the operation of a revise agent in a known CBR cycle.

In embodiments, a situation description agent, not explicitly shown in FIG. 10, receives the data stream from the monitored situation and generates a current case, i.e. a file comprising a description of the situation. In FIG. 10, the situation description agent is located within the revise agent 106 and so the data stream is input directly to the revise agent 106. In alternative implementations, the situation description agent may be separate from the revise agent 106.

The current case created by the situation description agent may have the same format as that used to store the description of a problem information for cases 21 in the case base 108. The situation description agent operates independently of the comparison agents and may be configured parallel to the comparison agents. In an embodiment, the situation description agent only generates the current case in response to receiving a request for the current case from the revise agent 106. The revise agent 106 only sends the request to the situation description agent when it has generated an adapted or new solution. In an alternative embodiment, the situation description agent automatically generates the current case without requiring a request to be received from the revise agent 106 and the generated current case is automatically sent to the revise agent 106.

The revise agent 106 receives the current case from the situation description agent. The revise agent 106 then generates a new case 21 based upon the generated solution and the current case. The new case 21 preferably comprises metadata with comparison information, as described above for the other cases 21 in the case base 108.

The retain agent 107 stores the new case 21 generated by the revise agent in the case base 108. The case 21 may be stored as, for example, an XML file or serialised code, as described above for the other cases 21 stored in the case base 108. The retain agent 107 also creates a new comparison agent for the case 21 and reconfigures the system so that the new comparison agent is supported and operates in the same way as that described above for the other comparison agents 101, 102 and 103. Accordingly, an additional data stream of parameters is created and transmitted to the new comparison agent and the overall similarity score generated for the new case 21 is input to the retrieval agent.

To create a CBR engine, all of the CBR agents, except the comparison agents, are first created. The retain agent 107 then creates a comparison agent for each case 21 stored in the case base 108 according to the above-described techniques. The computation units of the CBR engine are thereby created in dependence on the comparison information for each feature of each case 21. The process of creating each agent may also be referred as instantiation.

In operation, information on the most relevant cases 21 to a monitored situation is preferably displayed to a system operator using a case radar, as described in U.S. Pat. No. 8,170,800, which is incorporated herein by reference.

Figure 11:
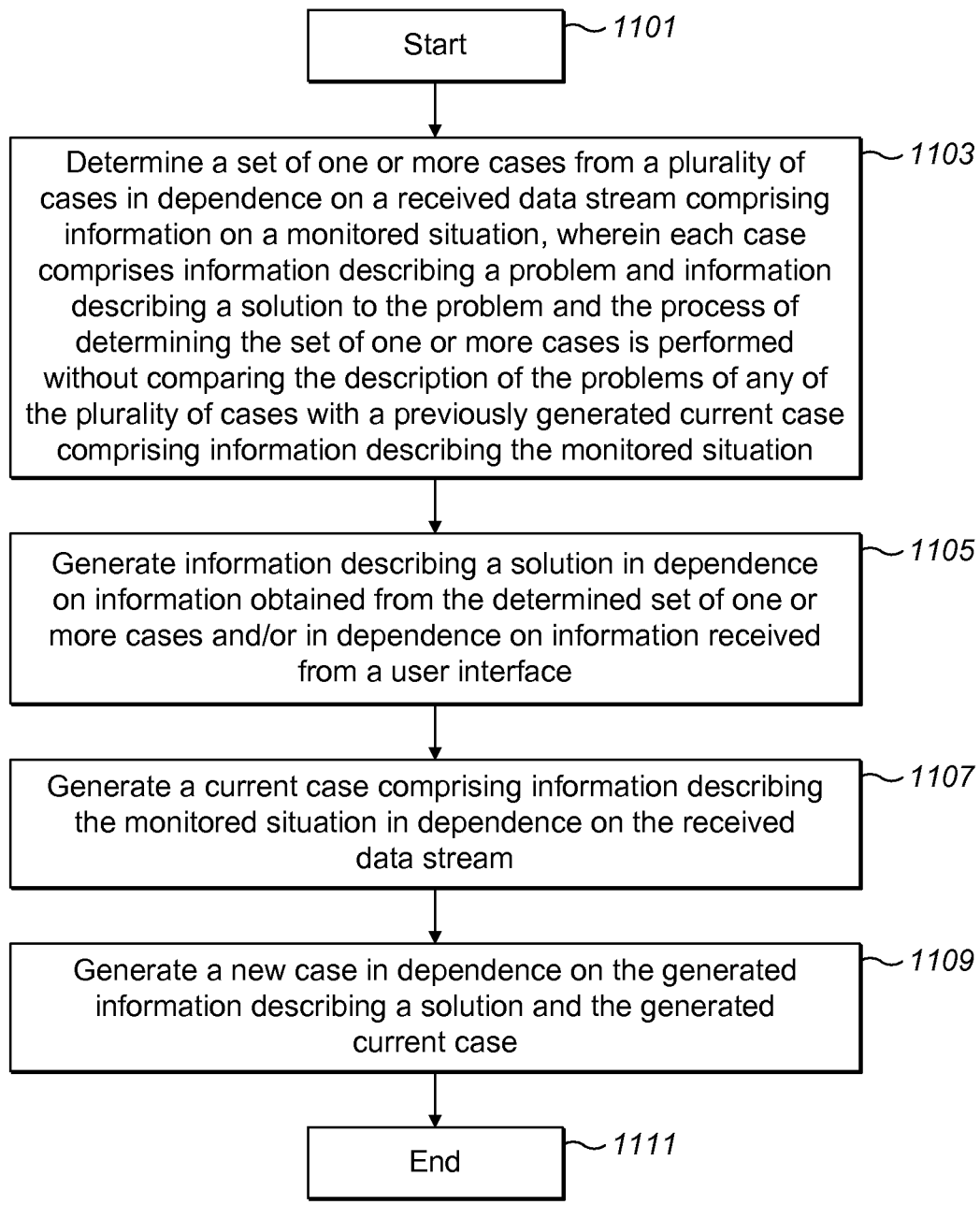
FIG. 11 shows the steps of a method for creating a new case using a CBR cycle according to an embodiment.

FIG. 11 shows the steps of a computer-implemented method for creating a new case 21 using a CBR cycle, the method performed by a CBR system for monitoring a situation, according to an embodiment.

In step 1101, the method starts.

In step 1103, the method determines a set of one or more cases 21 from a plurality of cases 21 in dependence on a received data stream comprising information on a monitored situation, wherein each case 21 comprises information describing a problem and information describing a solution to the problem and the process of determining the set of one or more cases 21 is performed without comparing the description of the problems of any of the plurality of cases 21 with a previously generated current case comprising information describing the monitored situation.

In step 1105, the method generates information describing a solution in dependence on information obtained from the determined set of one or more cases 21 and/or in dependence on information received from a user interface.

In step 1107, the method generates a current case information describing the monitored situation in dependence on the received data stream.

In step 1109, the method generates a new case 21 in dependence on the generated information describing a solution and the generated current case.

In step 1111, the method ends.

Advantageously, the CBR cycle allows proposed solutions to be provided to a system operator, with the proposed solutions being obtained from original cases 21 for a specific situation, from generic cases 21, or from modified cases 21.

In known CBR cycles, a current case comprising a description of a situation is first created and the cases in the case base are searched with the current case. To build a new case, the already created current case is combined with an adapted or new solution.

The CBR cycle according to embodiments is faster and/or more computationally efficient than known CBR cycles as the process of generating and sending a current case to all comparison agents is not required before the content of the case base 108 is searched. The situation description agent may operate in parallel with the comparison agents so that the current case is generated at the same time as the content of the case base 108 is searched. Alternatively, the situation description agent may only create a current case in response to an instruction from the revise agent 106 or an operator that the current case is required. This latter approach is more computationally efficient since the current case is only created when necessary.

Figure 12:
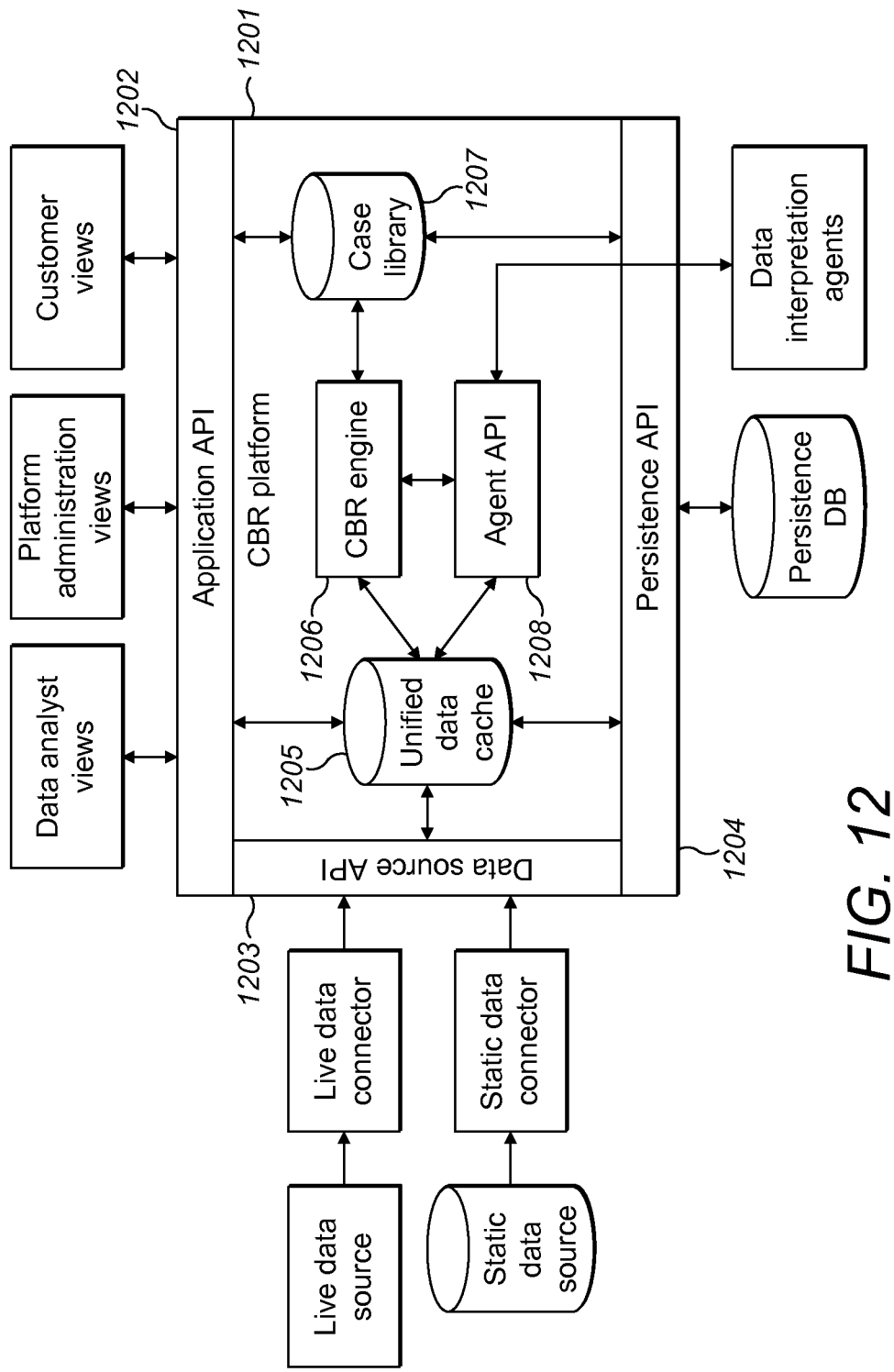
FIG. 12 shows a CBR platform according to an embodiment.

The high level architecture of a CBR system comprising a CBR platform according to embodiments is shown in FIG. 12. The CBR platform is designed to be scalable, flexible and adaptable so that it can be used in many different applications and is able to be integrated with a wide variety of data sources and third party systems. The CBR platform provides real-time decision support in dependence on received streamed data.

As shown in FIG. 12, the CBR system comprises the following components:

CBR platform 1201

Data sources (with Data source application programming interface, API)

Persistence database (with Persistence API)

Data interpretation agents (with Agent API)

User interfaces, UIs (with Application API)

The CBR platform 1201 comprises a system for scaling the deployment of data analysis components in a CBR application. The CBR platform 1201 is designed to be able to support very high data throughput and seamless scaling of an application by adding processing nodes, such as computer servers, and distributing computation across nodes in run-time.

Components of the CBR platform 1201 may include:

A CBR engine 1206. This is a high performance, real-time case-based reasoning engine. The CBR engine 1206 performs the CBR techniques of any of the embodiments of the invention described throughout the present document to generate overall similarity scores. The CBR engine 1206 receives one or more data streams, which describe the current status of a monitored situation, from a unified data cache 1205. The CBR engine 1206 also receives case information from a case library 1207 and compares the case information to that of the monitored situation. For each case 21 that a received data stream is compared to, an overall similarity score is generated. The overall similarity score may be in the form of a percentage match metric. The CBR engine 1206 therefore generates results that provide information on relevant cases 21. The results of the CBR engine 1206 are output to the unified data cache 1205.

A unified data cache 1205. The unified data cache 1205 is able to receive information from, and transmit information to, any of the APIs. The unified data cache 1205 may store data for use by data interpretation agents, which may perform pattern recognition, and may store the results of the data interpretation agents. The unified data cache 1205 also processes data for inputting to the CBR engine 1206. The results of case comparisons, by the CBR engine 1206, are stored in the unified data cache 1205. The case comparison results stored in the unified data cache 1205 may be output through the Application API and provided to users, such as system operators and data analysts. The data in the unified data cache 1205 may also be output to the persistence database through the persistence API and stored therein.

A case library 1207. This is a case base as described in the above embodiments. The case base may be, for example, a single database, a plurality of databases distributed across a plurality of hardware devices, a directory on a server or a plurality of directories on one or more servers.

Data interpretation agents. Although shown in FIG. 12 as being external to the CBR platform 1201, there may also be data interpretation agents within the CBR platform 1201. The data interpretation agents may also provide an executable input to the CBR engine 1206.

APIs are provided for data input to, and output from, the CBR platform 1201. These allow persistent data storage and also provide tools for data analysts and platform administrators. The APIs may be part of, and integral with, the CBR platform 1201 or they may be separate from the CBR platform 1201. The UIs, data sources, persistence database and external data interpretation agents do not form part of the CBR platform 1201 and may be custom devices for a specific application.

The data source API 1203 enables integration with a variety of data sources via data connectors, typically implemented as short programs, that connect data streams, that represent information on a monitored situation, from one or more data sources to the CBR platform 1201. The live and static data connectors receive information from respective live and static data sources and map the information to a unified data format. The data source API 1203 is provided so that the data connectors can be customised for different implementations. Default connectors may be used but the API also enables the implementation of custom data connectors developed specifically for the application that the CBR platform 1201 is required to support.

External of the CBR platform is a persistence database for permanently storing some or all of the data that is input to and/or generated within the CBR platform 1201. In particular, any new cases 21 generated by a revise agent may be stored in the persistence database. The persistence database may be that of a third party or a default database provided with the CBR platform 1201. It can be implemented according to any known storage solution, such as one or more databases or directories. The stored data in the persistence database can be used to replay situations in order to validate data interpretation agents and cases 21. Additional advantages of having such a persistence database are that it can be used to store the current data within the CBR platform 1201 to thereby allow fast system recovery if there is a system failure. Such an external database also facilitates the handling of big data.

The persistence database is supported through the persistence API 1204. The persistence database can be integrated with the CBR platform 1201 with short programs that translate between the CBR platform 1201 and the data storage solution, that may be a custom data storage solution.

Each application may have data interpretation agents internal and/or external of the CBR platform 1201. Tasks that may be performed by the data interpretation agents include pre-processing data and filtering out noise before the data is fed into the CBR engine 1206. The data interpretation agents may mine the unified data in order to identify patterns in it using pattern recognition methods. The pattern recognition methods may be standard or customised. The agents are typically highly modular and while some are application specific, others can be reused to identify similar patterns or perform similar noise filtering across a plurality of different applications. For example, an agent may use statistical methods to recognize when there is a sudden increase in a time series of data. An example of a more complex agent is one that may analyse trends in a set of parameters to detect certain patterns, such as when a few of the parameters have erratic values relative to the others. The data interpretation agents may therefore generate information for detecting specific events, or just single or streams of numerical values, for use in any of the case comparison processes.

The data interpretation agents communicate with the CBR platform 1201 through the agent API 1208. The agent API 1208 is shown within the CBR platform 1201 in FIG. 12 but may alternatively be on the edge of the CBR platform 1201, in the same way that the other APIs in FIG. 12 are shown. The agent API 1208 also enables third party developers to create custom agents. The agent API 1208 provides the CBR engine 1206 with information for detecting specific events, such as 'overpull' or 'tight spot' events during a drilling operation. The agent API 1208 may also provide the CBR engine 1206 with parameter information, for use by the comparison agents in generating similarity scores, and this information may be in the form of single parameter values or one or more data streams of parameter values. That is to say, the CBR engine 1206 may treat a data stream received from the agent API 1208 as if it were a data stream within the received data stream from a monitored situation and use the data stream to generate the overall similarity score for a case 21.

Default or custom UIs of applications can communicate with the platform through the Application API 1202.

Data analysts may be provided with UIs that enable them to view raw or analysed data going through the CBR platform 1201, view case data, add custom data interpretation agents, test data interpretation agents and case matching, capture cases 21 and configure cases 21 and the case library.

Platform administrators are provided with UIs that can be used for server cluster installation and configuration.

The results of the CBR engine 1206 may be displayed to a system operator using a case radar as described in U.S. Pat. No. 8,170,800. The radar provides a highly intuitive visualization that allows a system operator to easily identify relevant cases 21.

Advantageously, the CBR platform 1201 is highly adaptable and can be easily integrated into a wide range of applications. In addition, the CBR platform 1201, in particular the CBR engine 1206 within the CBR platform 1201, is highly scalable can therefore be used in applications that require a larger case base to be searched and/or large cases 21 within the case base to be searched. The CBR engine 1206 can easily adapt to different sizes of case base. A case base may increase in size if new cases 21 are added, or decrease if some of the existing cases 21 in the case base are deemed not relevant to the current situation and do not need to be used in comparisons.

A further advantage is that the CBR platform 1201 can be implemented by a distributed computing system. This increases the scalability, flexibility and adaptability of the CBR platform 1201.

Applications that the CBR platform 1201 is suitable for range from the oil and gas industry, in which the cases 21 are typically very large and the case comparisons computationally demanding, to the financial services industry, in which the case comparisons are typically less computationally demanding but the case base a lot larger.

Further embodiments include modifications and variations of the above described techniques.

For example, in the above-described techniques a comparison agent is created for each case 21 in the case base. An advantage of this approach is that the retrieval agent determines one or more similar cases 21 in dependence on all of the case information in the case base. An alternative approach is to first determine a subset of potentially relevant cases 21 from the case base and only generate comparison agents for the subset of cases 21. This requires the additional process of filtering the cases 21 in the case base so that the subset only includes cases 21 that are potentially relevant. However, the determination of one or more cases 21 is faster and more computationally efficient since fewer comparison agents are required.

The case 21 shown in FIG. 2 has separate dynamic and static data. This separation is not essential and the dynamic and static data may be fully or partially intermingled.

As shown in FIG. 5 a filter is provided that filters a received data stream into different data streams of parameters. This filtering is not essential and the data stream could have applied unfiltered to each computation unit. This would increase the amount of communicated information within each comparison agent but avoid the requirement of having a filter at the input to the comparison agent.

Similarly, in FIG. 6 it is not essential to filter the received data stream so that comparison agents are only provided with data streams of parameters that they require. Not filtering the received data stream increases the amount of communicated information within the CBR engine but the processing requirements at the input to the CBR engine are reduced.

As described above, embodiments of the CBR platform are particularly powerful tools for the energy, finance and healthcare industries. Embodiments are in no way restricted to these applications and the CBR engine may be used in any industry. In particular, the CBR engine can provide a powerful tool in the automobile industry, the fish farming industry and for the control of energy grids. Embodiments are particularly effective for applications, in any domain, in which humans are required to make decisions based on the information stored in real-time data streams.

The flowcharts and description thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

Some of the above-described embodiments are described with references to flowcharts and/or block diagrams of methods, apparatuses, and systems. One skilled in the art will appreciate that each block of the flowcharts, block diagrams, and/or their combinations can be implemented by computer program instructions. These computer program instructions may be provided to a processor of a general purpose computer(s) or computer system(s), special purpose computer(s) or computer system(s), other programmable data processing apparatus, or the like, to produce a machine, such that the instructions, executed via the processor of the computer (computer system, programmable data processing apparatus, or the like), create mechanisms for implementing the functions specified within the blocks of the flowcharts and/or block diagrams and/or within corresponding portions of the present disclosure.

These computer program instructions may also be stored in a computer-readable memory (or medium) and direct a computer (computer system, programmable data processing apparatus, or the like) to function in a particular manner, such that the instructions stored in the computer readable memory or medium produce an article of manufacture including instruction means which implement the functions specified in the blocks of the flowchart(s) and/or block diagram(s) and/or within corresponding portions of the present disclosure.

One skilled in the art will understand that any suitable computer-readable medium may be utilized. In particular, the computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (HPOM or Flash memory), a compact disc read-only memory (CD-ROM), and/or some other tangible optical and/or magnetic storage device. In other embodiments, the computer-readable medium may be transitory, such as, for example, a propagation signal including computer-executable program code portions embodied therein.

The computer program instructions may also be loaded onto a computer (computer system, other programmable data processing apparatus, or the like) to cause a series of operational steps to be performed on the computer (computer system, other programmable data processing apparatus, or the like) to produce a computer-implemented method or process such that the instructions executed on the computer (computer system, other programmable data processing apparatus, or the like) provide steps for implementing the functions/acts specified in the flowchart and/or block diagram block(s) and/or within corresponding portions of the present disclosure.

In some embodiments of the present disclosure, the above described methods and/or processes could be performed by a program executing in a programmable, general purpose computer or computer system. Alternative embodiments are implemented in a dedicated or special-purpose computer or computer system in which some or all of the operations, functions, steps, or acts are performed using hardwired logic or firmware.

Further, as used herein, the terms "unit" and "engine" may be understood to refer to computing software, firmware, hardware, and/or various combinations thereof.

The invention claimed is:

1. A computer-implemented method of controlling and monitoring a drilling operation by determining a set of one or more cases in case-based reasoning (CBR), the method comprising:
   receiving a data stream comprising information on a monitored situation;
   using a computer, generating a plurality of parallel data streams from the received data stream, each of the parallel data streams containing at least one parameter contained in the data stream;
   using a computer, generating an overall similarity score for each of the parallel data streams by comparing each parallel data stream to a different one of a plurality of cases; and
   determining a set of one or more cases in dependence on the generated overall similarity scores;
   wherein each of said overall similarity scores is generated by a different one of a plurality of comparison agents and each of the comparison agents receives one of the plurality of parallel data streams; and
   wherein each comparison agent generating one of said overall similarity scores by:
   receiving one of said plurality of parallel data streams;
   generating a further plurality of parallel data streams, wherein each of the generated further plurality of parallel data streams is dependent on said received one of the plurality of parallel data streams by the comparison agent;
   generating, for each of said generated further plurality of parallel data streams, a similarity score in dependence on a comparison between information on a feature in the generated further parallel data stream and stored information on the feature of a case, wherein each of the similarity scores of said generated further plurality of parallel data streams is generated in dependence on a comparison with stored information on a different feature of the same case;
   generating an overall similarity score between the received one of the plurality of parallel data streams and the case in dependence on the generated similarity scores; and
   controlling the drilling operation based on the generated similarity scores.

2. A non-transitory computer-readable storage medium storing a CBR engine which, when executed by a computing device, monitors a situation by determining a set of one or more cases, wherein the CBR engine is configured to perform the method of claim 1.

3. A non-transitory computer-readable storage medium storing a computer program that, when executed by a computing device, controls the computing device to perform the method of claim 1.

4. The method according to claim 1, further comprising determining to include a case in the set of one or more cases if the overall similarity score for the case is above a predetermined threshold level.

5. The method according to claim 1, wherein the determined set of cases has a predetermined number of two or more cases, and the method comprises determining the predetermined number of cases for including in the set as the cases with the highest overall similarity scores.

6. The method according to claim 1, further comprising displaying information dependent on each of the determined one or more cases.

7. The method according to claim 1, wherein each case comprises information that describes a situation in the energy industry.

* * * * *